US011164590B2

(12) United States Patent
Sehlstedt

(10) Patent No.: US 11,164,590 B2
(45) Date of Patent: **\*Nov. 2, 2021**

(54) ESTIMATION OF BACKGROUND NOISE IN AUDIO SIGNALS

(71) Applicant: Telefonaktiebolaget LM Ericsson (publ), Stockholm (SE)

(72) Inventor: Martin Sehlstedt, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/738,504

(22) Filed: Jan. 9, 2020

(65) Prior Publication Data

US 2020/0152217 A1     May 14, 2020

Related U.S. Application Data

(63) Continuation of application No. 16/382,719, filed on Apr. 12, 2019, now Pat. No. 10,573,332, which is a
(Continued)

(51) Int. Cl.
*G10L 21/0208*     (2013.01)
*G10L 21/0216*     (2013.01)
(Continued)

(52) U.S. Cl.
CPC .......... *G10L 21/0208* (2013.01); *G10L 19/18* (2013.01); *G10L 19/24* (2013.01);
(Continued)

(58) Field of Classification Search
CPC ........... H04M 1/62; H04W 8/22; G10L 19/18; G10L 19/24; G10L 21/0208;
(Continued)

(56) References Cited

U.S. PATENT DOCUMENTS 4,025,721 A    5/1977   Graupe et al.
4,542,525 A    9/1985   Hopf
(Continued)

FOREIGN PATENT DOCUMENTS

EP      2 629 295 A2    8/2013
RU      2441286 C2    1/2012
(Continued)

OTHER PUBLICATIONS

Cho, E. "Exploiting speech structure for noise estimation in single channel speech enhancement", Aug. 2013, Available from ProQuest Dissertations and Theses Professional. Retrieved from https://dialog.proquest.com/professional/docview/2453227038?accountid=131444 (Year: 2013).*

(Continued)

*Primary Examiner* — Eric Yen
(74) *Attorney, Agent, or Firm* — Sage Patent Group

(57) ABSTRACT

The disclosure relates to a background noise estimator and a method therein, for supporting sound activity detection in an audio signal segment. The method comprises reducing a current background noise estimate when the audio signal segment is determined to comprise music and the current background noise estimate exceeds a minimum value. This is to be performed when an energy level of an audio signal segment is more than a threshold higher than a long term minimum energy level, lt_min, which is determined over a plurality of preceding audio signal segments, or, when the energy level of the audio signal segment is less than a threshold higher than lt_min, but no pause is detected in the audio signal segment.

20 Claims, 9 Drawing Sheets

Related U.S. Application Data continuation of application No. 15/782,299, filed on Oct. 12, 2017, now Pat. No. 10,311,890, which is a continuation of application No. 15/446,634, filed on Mar. 1, 2017, now Pat. No. 9,818,434, which is a continuation of application No. 15/102,430, filed as application No. PCT/SE2014/051427 on Dec. 1, 2014, now Pat. No. 9,626,986.

(60) Provisional application No. 61/918,258, filed on Dec. 19, 2013.

(51) Int. Cl.
| | |
|---|---|
| *G10L 25/78* | (2013.01) |
| *G10L 25/21* | (2013.01) |
| *G10L 25/81* | (2013.01) |
| *G10L 19/18* | (2013.01) |
| *H04M 1/62* | (2006.01) |
| *H04W 8/22* | (2009.01) |
| *G10L 25/84* | (2013.01) |
| *G10L 19/24* | (2013.01) |
| *G10L 25/06* | (2013.01) |

(52) U.S. Cl.
CPC .......... *G10L 21/0216* (2013.01); *G10L 25/06* (2013.01); *G10L 25/21* (2013.01); *G10L 25/78* (2013.01); *G10L 25/81* (2013.01); *G10L 25/84* (2013.01); *H04M 1/62* (2013.01); *H04W 8/22* (2013.01); *G10L 2025/783* (2013.01); *G10L 2025/786* (2013.01)

(58) Field of Classification Search
CPC ..... G10L 21/0216; G10L 25/06; G10L 25/21; G10L 25/78; G10L 25/81; G10L 25/84; G10L 2025/783; G10L 2025/786
See application file for complete search history.

(56) References Cited

U.S. PATENT DOCUMENTS

| | | | |
|---|---|---|---|
| 4,628,529 A | 12/1986 | Borth et al. | |
| 4,653,098 A | 3/1987 | Nakata et al. | |
| 4,811,404 A * | 3/1989 | Vilmur | G10L 21/0208 327/552 |
| 5,485,522 A | 6/1996 | Sölve et al. | |
| 5,539,859 A * | 7/1996 | Robbe | G01S 3/808 704/226 |
| 5,657,422 A * | 8/1997 | Janiszewski | G10L 19/012 704/229 |
| 5,742,734 A * | 4/1998 | DeJaco | G10L 19/0204 704/226 |
| 5,768,473 A | 6/1998 | Eatwell et al. | |
| 5,845,522 A * | 12/1998 | Shen | E05B 55/005 70/224 |
| 6,035,048 A | 3/2000 | Diethorn | |
| 6,104,992 A | 8/2000 | Gao et al. | |
| 6,108,610 A | 8/2000 | Winn | |
| 6,157,670 A * | 12/2000 | Kosanovic | H04B 17/21 375/227 |
| 6,199,035 B1 | 3/2001 | Lakaniemi et al. | |
| 6,381,568 B1 | 4/2002 | Supplee et al. | |
| 6,424,938 B1 | 7/2002 | Johansson et al. | |
| 6,519,559 B1 * | 2/2003 | Sirivara | G10L 21/0208 704/227 |
| 6,570,991 B1 | 5/2003 | Scheirer et al. | |
| 6,584,438 B1 | 6/2003 | Manjunath et al. | |
| 6,810,273 B1 | 10/2004 | Mattila et al. | |
| 7,454,010 B1 * | 11/2008 | Ebenezer | G10L 21/0208 379/392.01 |
| 7,521,622 B1 | 4/2009 | Zhang | |
| 7,558,729 B1 | 7/2009 | Benyassine et al. | |
| 8,244,523 B1 | 8/2012 | Murphy | |
| 8,606,571 B1 * | 12/2013 | Every | G10L 21/0232 704/233 |
| 8,798,289 B1 * | 8/2014 | Every | G10L 25/48 381/94.1 |
| 2001/0028713 A1 | 10/2001 | Walker | |
| 2002/0016711 A1 | 2/2002 | Manjunath et al. | |
| 2002/0075856 A1 | 6/2002 | LeBlanc | |
| 2002/0116182 A1 | 8/2002 | Gao et al. | |
| 2002/0152066 A1 | 10/2002 | Piket | |
| 2002/0169602 A1 * | 11/2002 | Hodges | G10L 25/78 704/211 |
| 2002/0184015 A1 | 12/2002 | Li et al. | |
| 2003/0112265 A1 | 6/2003 | Zhang | |
| 2004/0137846 A1 | 7/2004 | Behboodian et al. | |
| 2004/0170290 A1 * | 9/2004 | Chang | G10L 19/032 381/94.2 |
| 2004/0210436 A1 | 10/2004 | Jiang et al. | |
| 2004/0236571 A1 | 11/2004 | Laurila et al. | |
| 2005/0060152 A1 | 3/2005 | Jiang et al. | |
| 2005/0102135 A1 | 5/2005 | Goronzy et al. | |
| 2005/0154583 A1 | 7/2005 | Naka et al. | |
| 2005/0159942 A1 | 7/2005 | Singhal | |
| 2005/0240401 A1 | 10/2005 | Ebenezer | |
| 2006/0265219 A1 | 11/2006 | Honda | |
| 2007/0078645 A1 | 4/2007 | Niemisto et al. | |
| 2007/0136053 A1 | 6/2007 | Ebenezer | |
| 2008/0027715 A1 | 1/2008 | Rajendran et al. | |
| 2008/0033583 A1 * | 2/2008 | Zopf | G10L 25/78 700/94 |
| 2008/0167870 A1 | 7/2008 | Hetherington et al. | |
| 2009/0012786 A1 | 1/2009 | Zhang et al. | |
| 2009/0043577 A1 | 2/2009 | Godavarti | |
| 2009/0088878 A1 | 4/2009 | Otsuka et al. | |
| 2009/0323976 A1 | 12/2009 | Asada et al. | |
| 2010/0223054 A1 | 9/2010 | Nemer et al. | |
| 2010/0239098 A1 | 9/2010 | Christoph | |
| 2010/0239104 A1 * | 9/2010 | Iser | G10L 21/0208 381/94.2 |
| 2010/0268533 A1 | 10/2010 | Park et al. | |
| 2011/0029308 A1 * | 2/2011 | Konchitsky | G10L 25/78 704/233 |
| 2011/0035213 A1 | 2/2011 | Malenovsky et al. | |
| 2011/0082692 A1 * | 4/2011 | Lim | G10L 21/0208 704/225 |
| 2011/0191101 A1 | 8/2011 | Uhle et al. | |
| 2012/0179458 A1 | 7/2012 | Oh et al. | |
| 2012/0209604 A1 * | 8/2012 | Sehlstedt | G10L 15/063 704/233 |
| 2012/0221326 A1 | 8/2012 | Grancharov et al. | |
| 2012/0303362 A1 | 11/2012 | Duni et al. | |
| 2013/0010983 A1 | 1/2013 | Disch et al. | |
| 2013/0103398 A1 | 4/2013 | Rauhala | |
| 2013/0226572 A1 | 8/2013 | Mason et al. | |
| 2015/0288826 A1 * | 10/2015 | Mani | H04M 9/082 379/406.08 |

FOREIGN PATENT DOCUMENTS

| | | |
|---|---|---|
| RU | 2011105976 A | 8/2012 |
| RU | 2012113087 A | 10/2013 |
| WO | WO 96/05592 A1 | 2/1996 |
| WO | WO 2011/049514 A1 | 4/2011 |
| WO | WO 2011/049515 A1 | 4/2011 |
| WO | WO 2016/018186 A1 | 2/2016 |

OTHER PUBLICATIONS

P. S. Hamilton, "A comparison of adaptive and nonadaptive filters for reduction of power line interference in the ECG," Jan. 1996, in IEEE Transactions on Biomedical Engineering, vol. 43, No. 1, pp. 105-109. (Year: 1996).*

International Search Report, Application No. PCT/SE2014/051427, dated Apr. 10, 2015.

Written Opinion of the International Searching Authority, Application No. PCT/SE2014/051427, dated Apr. 10, 2015.

International Preliminary Report on Patentability, Application No. PCT/SE2014/051427, dated Dec. 21, 2015.

(56) References Cited

OTHER PUBLICATIONS

3GPP, Technical Specification—"3rd Generation Partnership Project; Technical Specification Group Services and System Aspects; Mandatory speech CODEC speech processing functions; AMR speech CODEC; General description (Release 12)", 3GPP TS 26.071 V12.0.0 (Sep. 2014), 12 pp.

3GPP, Technical Specification—"3rd Generation Partnership Project; Technical Specification Group Services and System Aspects; Mandatory speech CODEC speech processing functions; AMR speech CODEC; General description (Release 11)", 3GPP TS 26.071 V11.0.0 (Sep. 2012), 12 pp.

International Telecommunication Union, "Series G: Transmission Systems and Media, Digital Systems and Networks Digital terminal equipments—Coding of voice and audio signals—Frame error robust narrow-band and wideband embedded variable bit-rate coding of speech and audio from 8-32 kbit/s", Recommendation ITU-T G.718, Jun. 2008, 257 pp.

Extended European Search Report, European Patent Application No. 14872781.1, dated Nov. 10, 2016, 8 pages.

Russian Office Action Corresponding to Application No. 2016128723/20(044794); dated Nov. 10, 2016; Foreign Text, 6 Pages, English Translation Thereof, 2 Pages.

\* cited by examiner

ESTIMATION OF BACKGROUND NOISE IN AUDIO SIGNALS

CROSS REFERENCE TO RELATED APPLICATIONS

This application is a Continuation Application of U.S. patent application Ser. No. 16/382,719, filed on Apr. 12, 2019, which is a Continuation Application of U.S. patent application Ser. No. 15/782,299, filed on Oct. 12, 2017, now U.S. Pat. No. 10,311,890, which is a Continuation Application of U.S. patent application Ser. No. 15/446,634, filed on Mar. 1, 2017, now U.S. Pat. No. 9,818,434, which is a Continuation Application of U.S. patent application Ser. No. 15/102,430, filed on Jun. 7, 2016, now U.S. Pat. No. 9,626,986, which is a 35 U.S.C. § 371 national stage application of PCT International Application No. PCT/SE2014/051427, filed on Dec. 1, 2014, which itself claims the benefit of U.S. Provisional Patent Application No. 61/918,258, filed Dec. 19, 2013, the disclosures and contents of which are incorporated by reference herein in their entireties. The above-referenced PCT International Application was published in the English language as International Publication No. WO 2015/094083 A1 on Jun. 25, 2015.

TECHNICAL FIELD

The embodiments of the present disclosure relate to audio coding, and in particular to estimation of background noise for supporting a sound activity decision.

BACKGROUND

In communication systems utilizing discontinuous transmission (DTX) it is important to find a balance between efficiency and not reducing quality. In such systems an activity detector is used to indicate active signals, e.g. speech or music, which are to be actively coded, and segments with background signals which can be replaced with comfort noise generated at the receiver side. If the activity detector is too efficient in detecting non-activity, it will introduce clipping in the active signal, which is then perceived as a subjective quality degradation when the clipped active segment is replaced with comfort noise. At the same time, the efficiency of the DTX is reduced if the activity detector is not efficient enough and classifies background noise segments as active and then actively encodes the background noise instead of entering a DTX mode with comfort noise. In most cases the clipping problem is considered worse.

FIG. 1 shows an overview block diagram of a generalized sound activity detector, SAD or voice activity detector, VAD, which takes an audio signal as input and produces an activity decision as output. The input signal is divided into data frames, i.e. audio signal segments of e.g. 5-30 ms, depending on the implementation, and one activity decision per frame is produced as output.

A primary decision, "prim", is made by the primary detector illustrated in FIG. 1. The primary decision is basically just a comparison of the features of a current frame with background features, which are estimated from previous input frames. A difference between the features of the current frame and the background features which is larger than a threshold causes an active primary decision. The hangover addition block is used to extend the primary decision based on past primary decisions to form the final decision, "flag". The reason for using hangover is mainly to reduce/remove the risk of mid and backend clipping of burst of activity. As indicated in the figure, an operation controller may adjust the threshold(s) for the primary detector and the length of the hangover addition according to the characteristics of the input signal. The background estimator block is used for estimating the background noise in the input signal. The background noise may also be referred to as "the background" or "the background feature" herein.

Estimation of the background feature can be done according to two basically different principles, either by using the primary decision, i.e. with decision or decision metric feedback, which is indicated by dash-dotted line in FIG. 1, or by using some other characteristics of the input signal, i.e. without decision feedback. It is also possible to use combinations of the two strategies.

An example of a codec using decision feedback for background estimation is AMR-NB (Adaptive Multi-Rate Narrowband) and examples of codecs where decision feedback is not used are EVRC (Enhanced Variable Rate CODEC) and G.718.

There are a number of different signal features or characteristics that can be used, but one common feature utilized in VADs is the frequency characteristics of the input signal. A commonly used type of frequency characteristics is the sub-band frame energy, due to its low complexity and reliable operation in low SNR. It is therefore assumed that the input signal is split into different frequency sub-bands and the background level is estimated for each of the sub-bands. In this way, one of the background noise features is the vector with the energy values for each sub-band. These are values that characterize the background noise in the input signal in the frequency domain.

To achieve tracking of the background noise, the actual background noise estimate update can be made in at least three different ways. One way is to use an Auto Regressive, AR, process per frequency bin to handle the update. Examples of such codecs are AMR-NB and G.718. Basically, for this type of update, the step size of the update is proportional to the observed difference between current input and the current background estimate. Another way is to use multiplicative scaling of a current estimate with the restriction that the estimate never can be bigger than the current input or smaller than a minimum value. This means that the estimate is increased each frame until it is higher than the current input. In that situation the current input is used as estimate. EVRC is an example of a codec using this technique for updating the background estimate for the VAD function. Note that EVRC uses different background estimates for VAD and noise suppression. It should be noted that a VAD may be used in other contexts than DTX. For example, in variable rate codecs, such as EVRC, the VAD may be used as part of a rate determining function.

A third way is to use a so-called minimum technique where the estimate is the minimum value during a sliding time window of prior frames. This basically gives a minimum estimate which is scaled, using a compensation factor, to get and approximate average estimate for stationary noise.

In high SNR cases, where the signal level of the active signal is much higher than the background signal, it may be quite easy to make a decision of whether an input audio signal is active or non-active. However, to separate active and non-active signals in low SNR cases, and in particular when the background is non-stationary or even similar to the active signal in its characteristics, is very difficult.

SUMMARY

It would be desirable to make more adequate decisions of whether an audio signal comprises active speech or music or not. Herein an improved method for generating a background noise estimate is provided, which enables a sound activity detector to make more adequate decisions.

According to a first aspect, a background noise estimation method is provided, for supporting sound activity detection in an audio signal segment. The method is intended to be performed by a background noise estimator. The method comprises reducing a current background noise estimate when the audio signal segment is determined to comprise music and the current background noise estimate exceeds a minimum value. This is to be performed when an energy level of an audio signal segment is more than a threshold higher than a long term minimum energy level, lt_min, which is determined over a plurality of preceding audio signal segments, or, when the energy level of the audio signal segment is less than a threshold higher than lt_min, but no pause is detected in the audio signal segment.

According to a second aspect, a background noise estimator is provided, for supporting sound detection in an audio signal segment. The background noise estimator is configured to: when an energy level of an audio signal segment is more than a threshold higher than a long term minimum energy level, lt_min, or, when the energy level of the audio signal segment is less than a threshold higher than lt_min, but no pause is detected in the audio signal segment: reduce a current background noise estimate when the audio signal segment is determined to comprise music and the current background noise estimate exceeds a minimum value.

According to a third aspect, a SAD is provided, which comprises a background noise estimator according to the second aspect.

According to a fourth aspect, a codec is provided, which comprises a background noise estimator according to the second aspect.

According to a fifth aspect, a communication device is provided, which comprises a background noise estimator according to the second aspect.

According to a sixth aspect, a network node is provided, which comprises a background noise estimator according to the second aspect.

According to a seventh aspect, a computer program is provided, comprising instructions which, when executed on at least one processor, cause the at least one processor to carry out the method according to the first aspect.

According to an eighth aspect, a carrier is provided, which contains a computer program according to the seventh aspect.

BRIEF DESCRIPTION OF DRAWINGS

The foregoing and other objects, features, and advantages of the technology disclosed herein will be apparent from the following more particular description of embodiments as illustrated in the accompanying drawings. The drawings are not necessarily to scale, emphasis instead being placed upon illustrating the principles of the technology disclosed herein.

DETAILED DESCRIPTION

Figure 1:
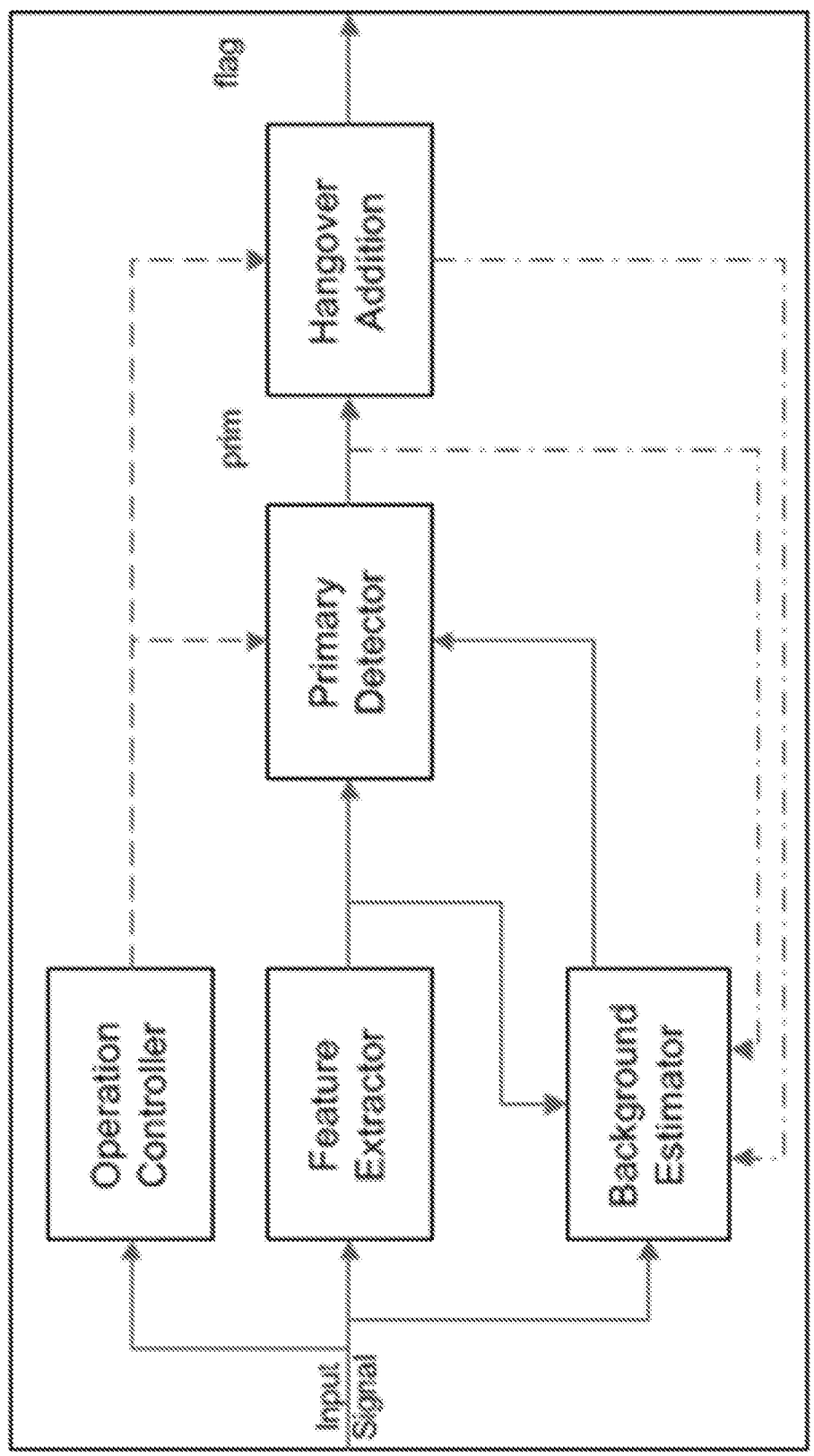
FIG. 1 is a block diagram illustrating an activity detector and hangover determination logic.

The solution disclosed herein relates to estimation of background noise in audio signals. In the generalized activity detector illustrated in FIG. 1, the function of estimating background noise is performed by the block denoted "background estimator". Some embodiments of the solution described herein may be seen in relation to solutions previously disclosed in WO2011/049514 and WO2011/049515, which are incorporated herein by reference. The solution disclosed herein will be compared to implementations of these previously disclosed applications. Even though the solutions disclosed in WO2011/049514 and WO2011/049515 are good solutions, the solution presented herein still has advantages in relation to these solutions. For example, the solution presented herein has an even less complex implementation and it is even more adequate in its tracking of background noise.

The performance of a VAD depends on the ability of the background noise estimator to track the characteristics of the background—in particular when it comes to non-stationary backgrounds. With better tracking it is possible to make the VAD more efficient without increasing the risk of speech clipping.

One problem with current noise estimation methods is that to achieve good tracking of the background noise in low SNR, a reliable pause detector is needed. For speech only input, it is possible to utilize the syllabic rate or the fact that a person cannot talk all the time to find pauses in the speech. Such solutions could involve that after a sufficient time of not making background updates, the requirements for pause detection are "relaxed", such that it is more probable to detect a pause in the speech. This allows for responding to abrupt changes in the noise characteristics or level. Some examples of such noise recovery logics are: 1) As speech utterances contain segments with high correlation after a sufficient number of frames without correlation it is usually safe to assume that there is a pause in the speech. 2) When the Signal to Noise Ratio, SNR>0, the speech energy is higher than the background noise, so if the frame energy is close to the minimum energy over a longer time, e.g. 1-5 seconds, it is also safe to assume that one is in a speech pause. While the previous techniques work well with speech only input they are not sufficient when music is considered an active input. In music there can be long segments with low correlation that still are music. Further, the dynamics of the energy in music can also trigger false pause detection, which may result in unwanted, erroneous updates of the background noise estimate.

Ideally, an inverse function of an activity detector, or what would be called a "pause occurrence detector", would be needed for controlling the noise estimation. This would ensure that the update of the background noise characteristics is done only when there is no active signal in the current frame. However, as indicated above, it is not an easy task to determine whether an audio signal segment comprises an active signal or not.

Traditionally, when the active signal was known to be a speech signal, the activity detector was called Voice Activity Detector (VAD). The term VAD for activity detectors is often used also when the input signal may comprise music. However, in modern codecs, it is also common to refer to the activity detector as a Sound Activity Detector (SAD) when also music is to be detected as an active signal.

The background estimator illustrated in FIG. 1 utilizes feedback from the primary detector and/or the hangover block to localize inactive audio signal segments. When developing the technology described herein, it has been a desire to remove, or at least reduce the dependency on such feedback. For the herein disclosed background estimation it has therefore been identified by the inventors as important to be able to find reliable features to identify the background signals characteristics when only an input signal with an unknown mixture of active and background signal is available. The inventors have further realized that it cannot be assumed that the input signal starts with a noise segment, or even that the input signal is speech mixed with noise, as it may be that the active signal is music.

One contribution of the embodiments herein to the prior art is the selection of features to use, and even more, how to combine the selected features to achieve a noise estimation logic that works reliably for different types of input.

As we have seen above, there are several features that work well for particular conditions. The difficulty is to combine them in a way that benefits noise estimation and background tracking. In particular if one is to avoid assumptions about initial conditions but rely only on the characteristics of the signal so far and be able to handle conditions where both speech and music are to be considered active inputs.

Figure 2:
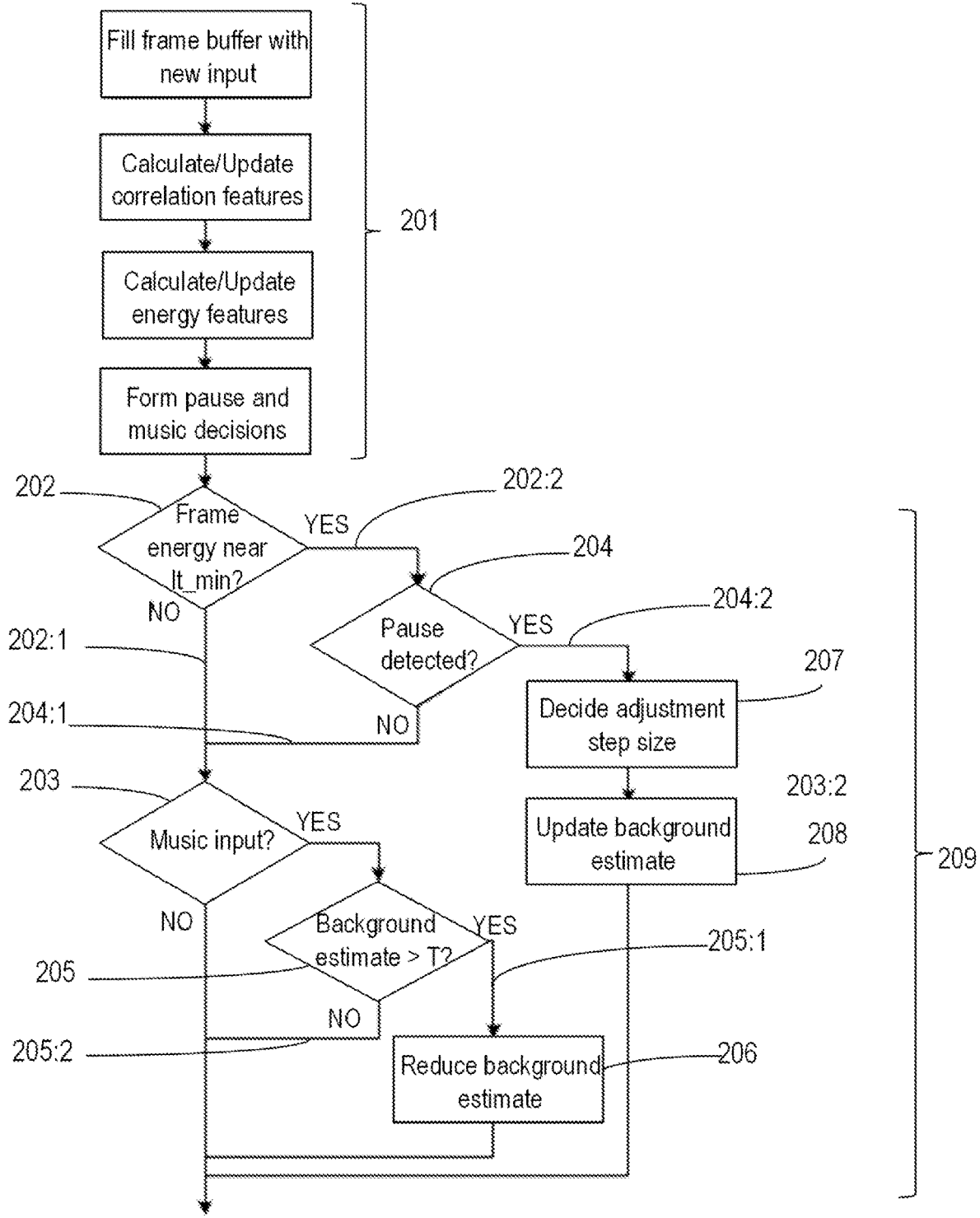
FIG. 2 is a flow chart illustrating a background update decision logic, according to an exemplifying embodiment.

FIG. 2 is a flow chart illustrating an exemplifying embodiment of a method for background noise estimation according to the herein proposed technology. The method is intended to be performed by a background noise estimator, which may be part of a SAD. The background noise estimator, and the SAD, may further be comprised in an audio encoder, which may in its turn be comprised in a wireless device or a network node. For the described background noise estimator, adjusting the noise estimate down, is not restricted. For each frame a possible new sub-band noise estimate is calculated, regardless if the frame is background or active content, if the new value is lower than the current it is used directly as it most likely would be from a background frame. The following noise estimation logic is a second step where it is decided if the sub-band noise estimate can be increased and if so how much, the increase is based on the previously calculated possible new sub-band noise estimate. Basically this logic forms the decision of the current frame is a background frame and if it is not sure it may allow a smaller increase compared to what was originally estimated.

The method illustrated in FIG. 2 comprises: when an energy level of an audio signal segment is more than a threshold higher 202:1 than a long term minimum energy level, lt_min, or, when the energy level of the audio signal segment is less than a threshold higher 202:2 than lt_min, but no pause is detected 204:1 in the audio signal segment:

reducing 206 a current background noise estimate when the audio signal segment is determined 203:2 to comprise music and the current background noise estimate exceeds a minimum value 205:1, denoted "T" in FIG. 2, and further exemplified e.g. as 2*E_MIN in code below.

By performing the above, and providing the background noise estimate to a SAD, the SAD is enabled to perform more adequate sound activity detection. Further, recovery from erroneous background noise estimate updates is enabled.

The energy level of the audio signal segment used in the method described above may alternatively be referred to e.g. as the current frame energy, Etot, or as the energy of the signal segment, or frame, which can be calculated by summing the sub-band energies for the current signal segment.

The other energy feature used in the method above, i.e. the long term minimum energy level, lt_min, is an estimate, which is determined over a plurality of preceding audio signal segments or frames. lt_min could alternatively be denoted e.g. Etot_l_lp One basic way of deriving lt_min would be to use the minimum value of the history of current frame energy over some number of past frames. If the value calculated as: "current frame energy—long term minimum estimate" is below a threshold value, denoted e.g. THR1, the current frame energy is herein said to be close to the long term minimum energy, or to be near the long term minimum energy. That is, when (Etot—lt_min)<THR1, the current frame energy, Etot, may be determined 202 to be near the long term minimum energy lt_min. The case when (Etot—lt_min)=THR1 may be referred to either of the decisions, 202:1 or 202:2, depending on implementation. The numbering 202:1 in FIG. 2 indicates the decision that the current frame energy is not near lt_min, while 202:2 indicates the decision that the current frame energy is near lt_min. Other numbering in FIG. 2 on the form XXX:Y indicates corresponding decisions. The feature lt_min will be further described below.

The minimum value, which the current background noise estimate is to exceed, in order to be reduced, may be assumed to be zero or a small positive value. For example, as will be exemplified in code below, a current total energy of the background estimate, which may be denoted "totalNoise" and be determined e.g. as 10*log 10 ΣZbackr[i], may be required to exceed a minimum value of zero in order for the reduction to come in question. Alternatively, or in addition, each entry in a vector backr[i] comprising the sub-band background estimates may be compared to a minimum value, E_MIN, in order for the reduction to be performed. In the code example below, E_MIN is a small positive value.

It should be noted that according to a preferred embodiment of the solution suggested herein, the decision of whether the energy level of the audio signal segment is more than a threshold higher than lt_min is based only on information derived from the input audio signal, that is, it is not based on feedback from a sound activity detector decision.

The determining 204 of whether a current frame comprises a pause or not may be performed in different ways based on one or more criteria. A pause criterion may also be referred to as a pause detector. A single pause detector could be applied, or a combination of different pause detectors. With a combination of pause detectors each can be used to detect pauses in different conditions. One indicator of that a current frame may comprise a pause, or inactivity, is that a correlation feature for the frame is low, and that a number of preceding frames also have had low correlation features. If the current energy is close to the long term minimum energy and a pause is detected, the background noise can be updated according to the current input, as illustrated in FIG. 2. A pause may be considered to be detected when, in addition to that the energy level of the audio signal segment is less than a threshold higher than lt_min: a predefined number of consecutive preceding audio signal segments have been determined not to comprise an active signal and/or a dynamic of the audio signal exceeds a threshold. This is also illustrated in the code example further below.

The reduction 206 of the background noise estimate enables handling of situations where the background noise estimate has become "too high", i.e. in relation to a true background noise. This could also be expressed e.g. as that the background noise estimate deviates from the actual background noise. A too high background noise estimate may lead to inadequate decisions by the SAD, where the current signal segment is determined to be inactive even though it comprises active speech or music. A reason for the background noise estimate becoming too high is e.g. erroneous or unwanted background noise updates in music, where the noise estimation has mistaken music for background and allowed the noise estimate to be increased. The disclosed method allows for such an erroneously updated background noise estimate to be adjusted e.g. when a following frame of the input signal is determined to comprise music. This adjustment is done by a forced reduction of the background noise estimate, where the noise estimate is scaled down, even if the current input signal segment energy is higher than the current background noise estimate, e.g. in a sub-band. It should be noted that the above described logic for background noise estimation is used to control the increase of background sub-band energy. It is always allowed to lower the sub-band energy when the current frame sub-band energy is lower than the background noise estimate. This function is not explicitly shown in FIG. 2. Such a decrease usually has a fixed setting for the step size. However, the background noise estimate should only be allowed to be increased in association with the decision logic according to the method described above. When a pause is detected, the energy and correlation features may also be used for deciding 207 how large the adjustment step size for the background estimate increase should be before the actual background noise update is made.

As previously mentioned, some music segments can be difficult to separate from background noise, due to that they are very noise like. Thus, the noise update logic may accidentally allow for increased sub-band energy estimates, even though the input signal was an active signal. This can cause problems as the noise estimate can become higher than they should be.

In prior art background noise estimators, the sub-band energy estimates could only be reduced when an input sub-band energy went below a current noise estimate. However, since some music segments can be difficult to separate from background noise, due to that they are very noise like, the inventors have realized that a recovery strategy for music is needed. In the embodiments described herein, such a recovery can be done by forced noise estimate reduction when the input signal returns to music-like characteristics. That is, when the energy and pause logic described above prevent, 202:1, 204:1, the noise estimation from being increased, it is tested 203 if the input is suspected to be music and if so 203:2, the sub-band energies are reduced 206 by a small amount each frame until the noise estimates reaches a lowest level 205:2.

Figure 3:
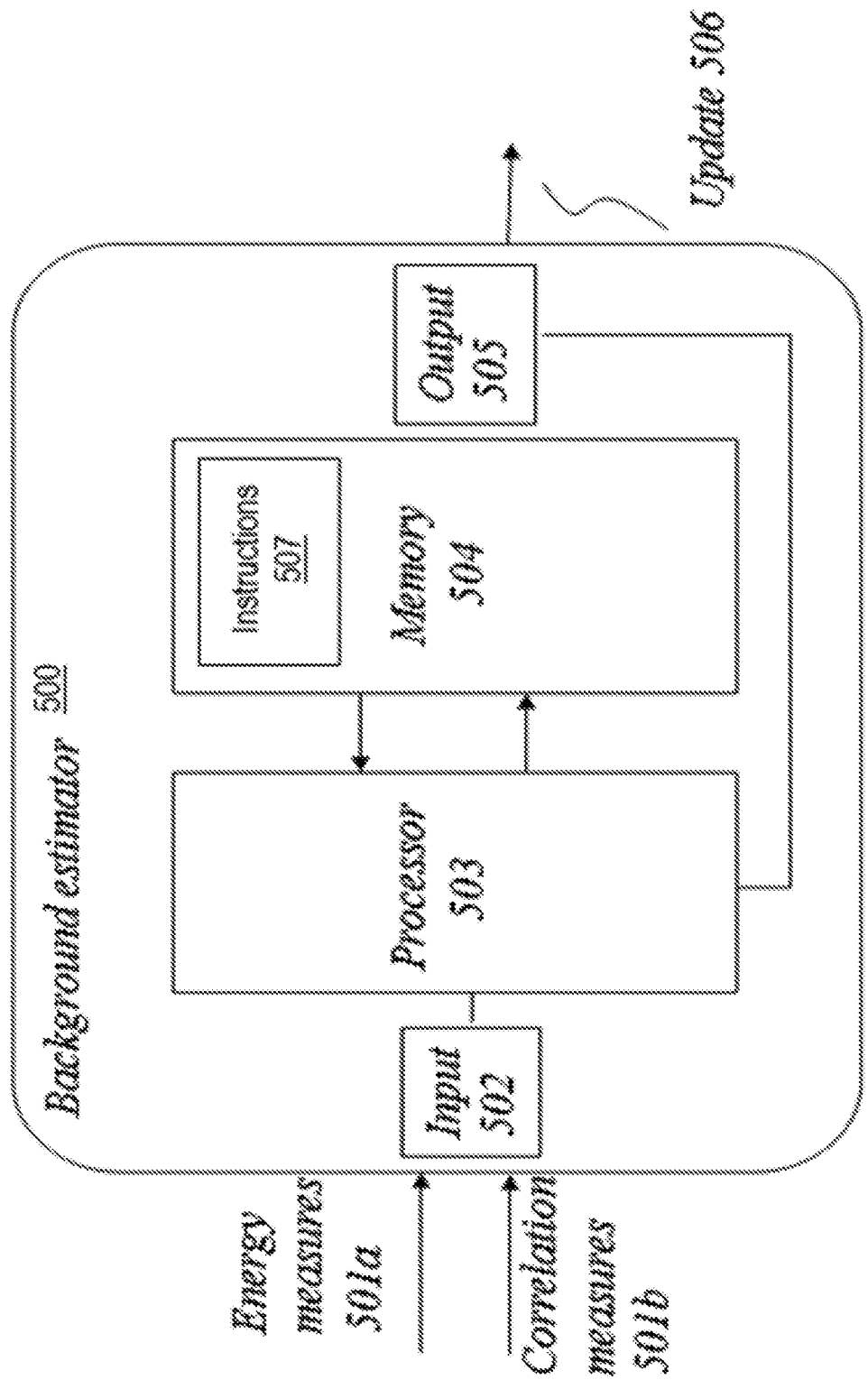
FIGS. 3 and 4 show a background estimator according to different exemplifying embodiments.

The solution disclosed herein also relates to a background estimator implemented in hardware and/or software. A background estimator 500 according to an exemplifying embodiment is schematically illustrated in FIG. 3. The background estimator 500 may be assumed to comprise an input unit 502 for receiving energy measures and possibly correlation measures; and an output unit 505 for providing an updated background noise estimate. The background estimator 500 further comprises a processor 503 and a memory 504, said memory containing instructions 507 executable by said processor 504. The execution of the instructions 507 makes said background estimator 500 operative to perform at least one embodiment of the method for background noise estimation described above. In other words, the execution of the instructions 507 by the processing means 503 makes the background estimator 500 operative to: when an energy level of an audio signal segment is more than a threshold higher than a long term minimum energy level, lt_min, which is determined over a plurality of preceding audio signal segments, or, when the energy level of the audio signal segment is less than a threshold higher than lt_min, but no pause is detected in the audio signal segment:

reduce a current background noise estimate when the audio signal segment is determined to comprise music and the current background noise estimate exceeds a minimum value; The instructions 507 may be stored in form of computer code, e.g. as the one presented further below in this disclosure. The instructions or computer program may be carried by a carrier before being stored and/or executed by the background estimator. Such a carrier may be e.g. an electronic signal, an optical signal, a radio signal, or, a computer readable storage medium.

Figure 4:
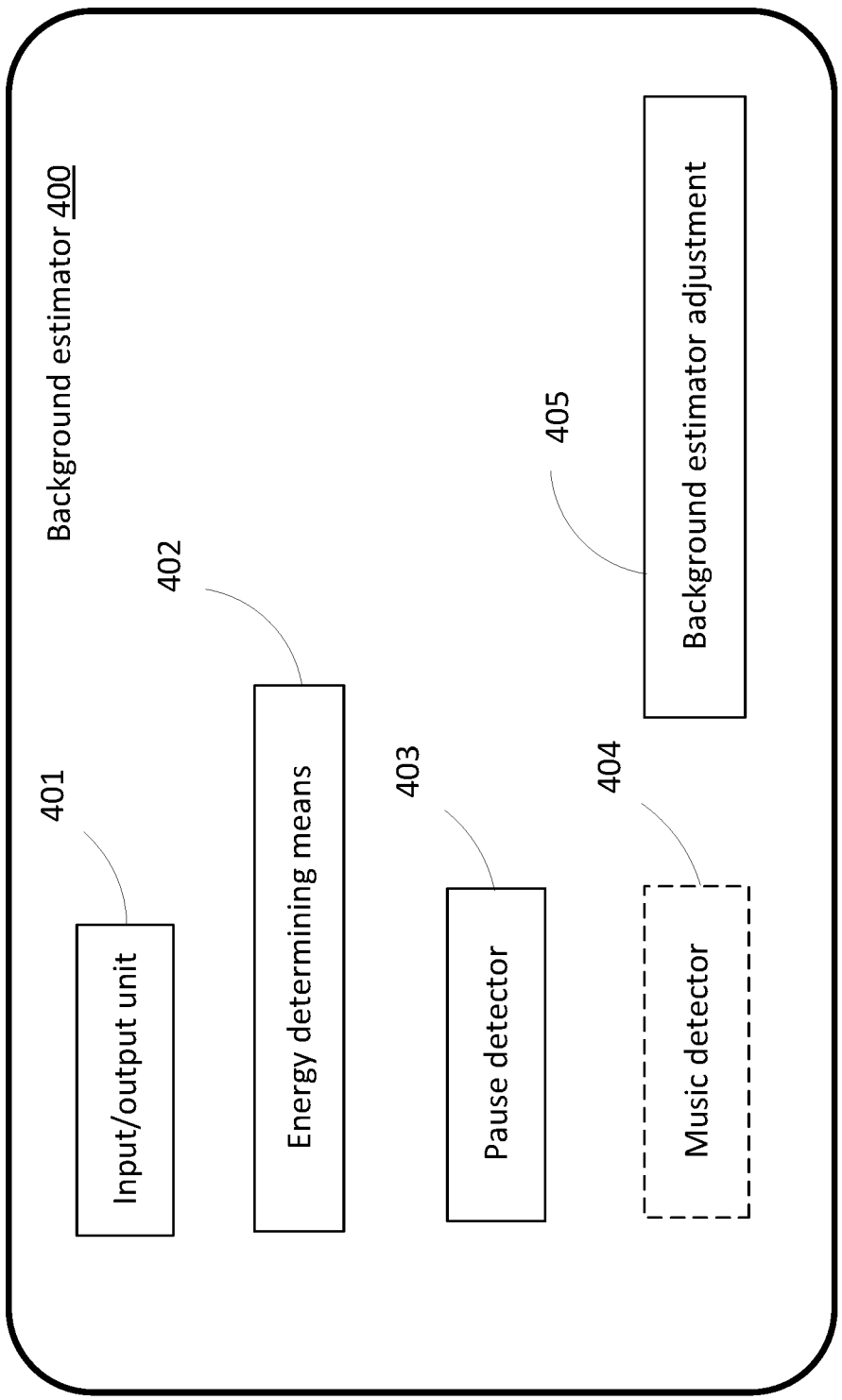

FIG. 4 shows an alternative implementation of a background estimator. The background estimator 400 comprises an input/output unit 401, energy determining means 402 configured for determining whether the current frame energy is close to a long term minimum energy estimate or not, a pause detector 403, configured to determine whether a current frame comprises a pause, music detector, configured to determine whether a current frame comprises music or not. The background estimator 400 further comprises a background estimator adjuster 405, configured to: when an energy level of an audio signal segment is more than a threshold higher than a long term minimum energy level, lt_min, or, when the energy level of the audio signal segment is less than a threshold higher than lt_min, but no pause is detected in the audio signal segment: —reduce a current background noise estimate when the audio signal segment is determined to comprise music and the current background noise estimate exceeds a minimum value. The background estimator adjuster 405 may also be configured to perform e.g. a regular adjustment, as the one illustrated as 208 in FIG. 3.

A background estimator as the ones described above can be comprised or implemented in a VAD or SAD and/or in an encoder and/or a decoder, wherein the encoder and/or decoder can be implemented in a user device, such as a mobile phone, a laptop, a tablet, etc. The background estimator could further be comprised in a network node, such as a Media Gateway, e.g. as part of a codec.

Figure 5:
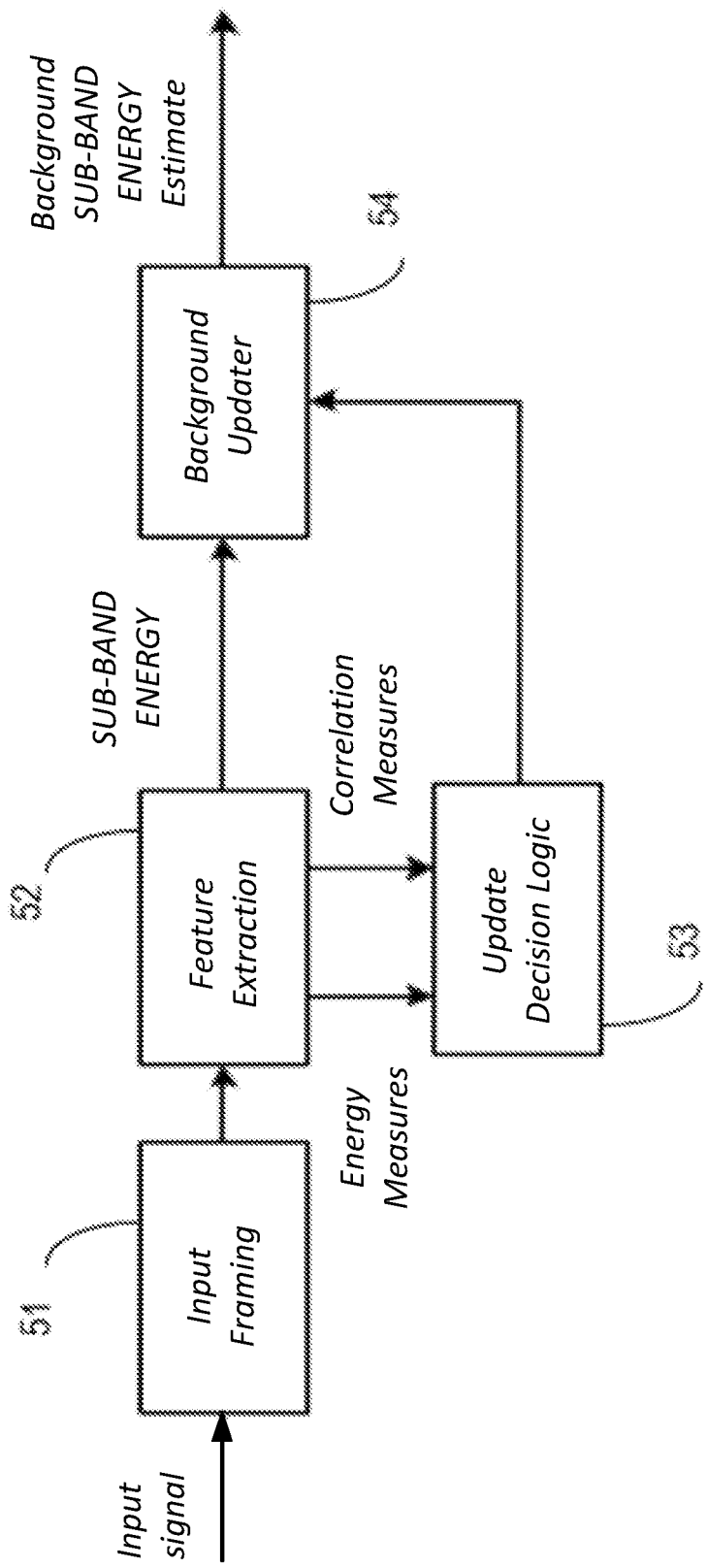
FIG. 5 is a block diagram showing a sub-band energy background estimator.

FIG. 5 is a block diagram schematically illustrating an implementation of a background estimator according to an exemplifying embodiment. An input framing block 51 first divides the input signal into frames of suitable length, e.g. 5-30 ms. For each frame, a feature extractor 52 calculates at least the following features from the input: 1) The feature extractor analyzes the frame in the frequency domain and the energy for a set of sub-bands are calculated. The sub-bands are the same sub-bands that are to be used for the background estimation. 2) The feature extractor further analyzes the frame in the time-domain and calculates a correlation denoted e.g. cor_est and/or lt_cor_est, which is used in determining whether the frame comprises active content or not. 3) The feature extractor further utilizes the current frame total energy, e.g. denoted Etot, for updating features for energy history of current and earlier input frames, such as the long term minimum energy, lt_min. The correlation and energy features are then fed to the Update Decision Logic block 53.

Here, a decision logic according to the herein disclosed solution is implemented in the Update Decision Logic block 53, where the correlation and energy features are used to form decisions on whether the current frame energy is close to a long term minimum energy or not; on whether the current frame is part of a pause (not active signal) or not; and whether the current frame is part of music or not. The solution according to the embodiments described herein involves how these features and decisions are used to update the background noise estimation in a robust way.

Below, some implementation details of embodiments of the solution disclosed herein will be described. The implementation details below are taken from an embodiment in a G.718 based encoder. This embodiment uses some of the features described in WO2011/049514 and WO2011/049515, of which parts are appended to this disclosure.

The following features are defined in the modified G.718 described in WO2011/09514:

| | |
|---|---|
| Etot; | The total energy for current input frame |
| Etot_l | Tracks the miminum energy enevelope |
| Etot_l_lp; | A Smoothed version of the mimimum energy evnelope Etot_l |
| totalNoise; | The current total energy of the background estimate |
| bckr[i]; | The vector with the sub-band background estimates |
| tmpN[i]; | A precalculated potential new background estimate |
| aEn; | A background detector which uses multiple features (a counter) |
| harm_cor_cnt | Counts the frames since the last frame with correlation or harmonic event |
| act_pred | A prediction of activity from input frame features only |
| cor[i] | Vector with correlation estimates for, i = 0 end of current frame, i = 1 start of current frame, i = 2 end of previous frame |

The following features are defined in the modified G.718 described in WO2011/09515:

| | |
|---|---|
| Etot_h | Tracks the maximum energy envelope |
| sign_dyn_lp; | A smoothed input signal dynamics |

Also the feature Etot_v_h was defined in WO2011/049514, but in this embodiment it has been modified and is now implemented as follows:

```
Etot_v = (float) fabs(*Etot_last - Etot);
if( Etot_v < 7.0f)   /*note that no VAD flag or similar is used here*/
{
  *Etot_v_h -= 0.01f;
  if (Etot_v > *Etot_v_h)
  {
    if ((*Etot_v -*Etot_v_h) > 0.2f)
    {
    *Etot_v_h = *Etot_v_h + 0.2f;
    }
    else
    {
      *Etot_v_h = Etot_v; }}}
```

Etot_v measures the absolute energy variation between frames, i.e. the absolute value of the instantaneous energy variation between frames. In the example above, the energy variation between two frames is determined to be "low" when the difference between the last and the current frame energy is smaller than 7 units. This is utilized as an indicator of that the current frame (and the previous frame) may be part of a pause, i.e. comprise only background noise. However, such low variance could alternatively be found e.g. in the middle of a speech burst. The variable Etot_last is the energy level of the previous frame.

The above steps described in code may be performed as part of the "calculate/update correlation and energy" steps in the flow chart in FIG. 2, i.e. as part of the actions 201. In the WO2011/049514 implementation, a VAD flag was used to determine whether the current audio signal segment comprised background noise or not. The inventors have realized that the dependency on feedback information may be problematic. In the herein disclosed solution, the decision of whether to update the background noise estimate or not is not dependent on a VAD (or SAD) decision.

Further, in the herein disclosed solution, the following features, which are not part of the WO2011/049514 implementation, may be calculated/updated as part of the same steps, i.e. the calculate/update correlation and energy steps illustrated in FIG. 2. These features are also used in the decision logic of whether to update the background estimate or not.

In order to achieve a more adequate background noise estimate, a number of features are defined below. For example, the new correlation related features cor_est and lt_cor_est are defined. The feature cor_est is an estimate of the correlation in the current frame, and cor_est is also used to produce lt_cor_est, which is a smoothed long-term estimate of the correlation.

$$cor\_est=(cor[0]+cor[1]+cor[2])/3.0f;$$

$$st \to lt\_cor\_est = 0.01f * cor\_est + 0.99f * st \to lt\_cor\_est;$$

As defined above, cor[i] is a vector comprising correlation estimates, and cor[0] represents the end of the current frame, cor[1] represents the start of the current frame, and cor[2] represents the end of a previous frame.

Further, a new feature, lt_tn_track, is calculated, which gives a long term estimate of how often the background estimates are close to the current frame energy. When the current frame energy is close enough to the current background estimate this is registered by a condition that signals (1/0) if the background is close or not. This signal is used to form the long-term measure lt_tn_track.

$$st \to lt\_tn\_track = 0.03f * (Etot - st \to totalNoise < 10) + 0.97f * st \to lt\_tn\_track;$$

In this example, 0.03 is added when the current frame energy is close to the background noise estimate, and otherwise the only remaining term is 0.97 times the previous value. In this example, "close" is defined as that the difference between the current frame energy, Etot, and the background noise estimate, totalNoise, is less than 10 units. Other definitions of "close" are also possible.

Further, the distance between the current background estimate, Etot, and the current frame energy, totalNoise, is used for determining a feature, lt_tn_dist, which gives a long term estimate of this distance. A similar feature, lt_Ellp_dist, is created for the distance between the long term minimum energy Etot_l_lp and the current frame energy, Etot.

$$st \to lt\_tn\_dist = 0.03f * (Etot - st \to totalNoise) + 0.97f * st \to lt\_tn\_dist;$$

$$st \to lt\_Ellp\_dist = 0.03f * (Etot - st \to Etot\_l\_lp) + 0.97f * st \to lt\_Ellp\_dist;$$

The feature harm_cor_cnt, introduced above, is used for counting the number of frames since the last frame having a correlation or a harmonic event, i.e. since a frame fulfilling certain criteria related to activity. That is, when the condition harm_cor_cnt==0, this implies that the current frame most likely is an active frame, as it shows correlation or a harmonic event. This is used to form a long term smoothed estimate, lt_haco_ev, of how often such events occur. In this case the update is not symmetric, that is different time constants are used if the estimate is increased or decreased, as can be seen below.

```
if (st->harm_cor_cnt == 0)   /*when probably active*/
{
    st->lt_haco_ev = 0,03f + 0.97f*st->lt_haco_ev;   /*increase long term estimate*/
}
else
{
    st->lt_haco_ev = 0.99f*st->lt_haco_ev; /*decrease long term estimate */
}
```

A low value of the feature lt_tn_track, introduced above, indicates that the input frame energy has not been close to the background energy for some frames. This is due to that lt_to_track is decreased for each frame where the current frame energy is not close to the background energy estimate. lt_tn_track is increased only when the current frame energy is close to the background energy estimate as shown above. To get a better estimate of how long this "non-tracking", i.e. the frame energy being far from the background estimate, has lasted, a counter, low_tn_track_cnt, for the number of frames with this absence of tracking is formed as:

```
if (st->lt_tn_track<0.05f)    /*when lt_tn_track is low */
{
    st->low_tn_track_cnt++;   /*add 1 to counter */
}
else
{
     st->low_tn_track_cnt=0;    /*reset counter */
}
```

In the example above, "low" is defined as below the value 0.05. This should be seen as exemplifying value, which could be selected differently.

For the step "Form pause and music decisions" illustrated in FIG. 2, the following three code expressions are used to form pause detection, also denoted background detection. In other embodiments and implementations, other criteria could also be added for pause detection. The actual music decision is formed in the code using correlation and energy features.

1: bg_bgd=Etot<Etot_l_lp+0.6f*st→Etot_v_h;

bg_bgd will become "1" or "true" when Etot is close to the background noise estimate. bg_bgd serves as a mask for other background detectors. That is, if bg_bgd is not "true", the background detectors 2 and 3 below do not need to be evaluated. Etot_v_h is a noise variance estimate, which could alternatively be denoted $N_{var}$. Etot_v_h is derived from the input total energy (in log domain) using Etot_v which measures the absolute energy variation between frames. Note that the feature Etot_v_h is limited to only increase a maximum of a small constant value, e.g. 0.2 for each frame. Etot_l_lp is a smoothed version of the mimimum energy envelope Etot_I.

2: aE_bgd=st→aEn==0;

When aEn is zero, aE_bgd becomes "1" or "true". aEn is a counter which is incremented when an active signal is determined to be present in a current frame, and decreased when the current frame is determined not to comprise an active signal. aEn may not be incremented more than to a certain number, e.g. 6, and not be reduced to less than zero. After a number of consecutive frames, e.g. 6, without an active signal, aEn will be equal to zero.

3: sd1_bgd=(st→sign_dyn_lp>15)&&(Etot-st→Etot_l_lp)<st→Etot_v_h && st—>harm_cor_cnt>20;

Here, sd1_bgd will be "1" or "true" when three different conditions are true: The signal dynamics, sign_dyn_lp is high, in this example more than 15; The current frame energy is close to the background estimate; and: A certain number of frames have passed without correlation or harmonic events, in this example 20 frames.

The function of the bg_bgd is to be a flag for detecting that the current frame energy is close to the long term minimum energy. The latter two, aE_bgd and sd1_bgd represent pause or background detection in different conditions. aE_bgd is the most general detector of the two, while sd1_bgd mainly detects speech pauses in high SNR.

A new decision logic according to an embodiment of the technology disclosed herein, is constructed as follows in code below. The decision logic comprises the masking condition bg_bgd, and the two pause detectors aE_bgd and sd1_bgd. There could also be a third pause detector, which evaluates the long term statistics for how well the totalNoise tracks the minimum energy estimate. The conditions evaluated if the first line is true is decision logic on how large the step size should be, updt_step and the actual noise estimation update is the assignment of value to "st→bckr[i]==". Note the tmpN[i] is a previously calculated potentially new noise level calculated according to the solution described in WO2011/049514. The decision logic below follows the part 209 of FIG. 2, which is partly indicated in connection with the code below

```
if (bg_bgd && ( aE_bgd || sd1_bgd || st->lt_tn_track >0.90f ) ) /*if 202:2 and 204:2)*/
{
    if(  (st->act_pred < 0.85f || ( aE_bgd && st->lt_haco_ev < 0.05f) ) &&
        (st->lt_Ellp_dist < 10 || sd1_bgd ) && st->lt_tn_dist<40 &&
        ( (Etot - st->totalNoise ) < 15.0f || st->lt_haco_ev < 0.10f ) )   /*207*/
    {
      st->first_noise_updt = 1;
      for( i=0; i< NB_BANDS; i++)
      {
        st->bckr[i] = tmpN[i]                     /*208*/
      }
    }
    else if (aE_bgd && st->lt_haco_ev < 0.15f)
    {
```

```
    updt_step=0.1f;
    if (st->act_pred > 0.85f)
    {
        updt_step=0.01f                    /*207*/
    }
    if (updt_step > 0.0f)
    {
      st->first_noise_updt = 1;
      for[ i=0; i< NB_BANDS; i++)
      {
          st->bckr[i] = st->bckr[i] + updt_step * (tmpN[i]-st->bckr[i]);
      /*208*/
    }}}
      else
   {
      (st->first_noise_updt) +=1;
      }
   }
 }
  else
  {
      /* If in music lower bckr to drop further */ /*if 203:2 and 205:1*/
      If ( st->low_tn_track_cnt > 300 && st->lt_haco_ev > 0.9f && st->
totalNoise > 0.0f)
        {
          For ( i=0; i< NB_BANDS; i++)
          {
            If (st->bckr[i] > 2* E_MIN
            {
              St->bckr[i] = 0.98f * st->bckr[i];           /*206*/
            }
          }
        }
        Else
        {
          (st->first_noise_updt) += 1;
        }
 }
```

The code segment in the last code block starting with "/* If in music . . . */ contains the forced down scaling of the background estimate which is used if it is suspected that the current input is music. This is decided as a function: long period of poor tracking background noise compared to the minimum energy estimate, AND, frequent occurrences of harmonic or correlation events, AND, the last condition "totalNoise>0" is a check that the current total energy of the background estimate is larger than zero, which implies that a reduction of the background estimate may be considered. Further, it is determined whether "bckr[i]>2*E_MIN", where E_MIN is a small positive value. This is a check of each entry in a vector comprising the sub-band background estimates, such that an entry needs to exceed E_MIN in order to be reduced (in the example by being multiplied by 0.98). These checks are made in order to avoid reducing the background estimates into too small values.

The embodiments improve the background noise estimation which allows improved performance of the SAD/VAD to achieve high efficient DTX solution and avoid the degradation in speech quality or music caused by clipping.

With the removal of the decision feedback described in WO2011/09514 from the Etot_v_h, there is a better separation between the noise estimation and the SAD. This has benefits as that the noise estimation is not changed if/when the SAD function/tuning is changed. That is, the determining of a background noise estimate becomes independent of the function of the SAD. Also the tuning of the noise estimation logic becomes easier as one is not affected by secondary effects from the SAD when the background estimates are changed.

Below follows description of figures illustrating the problems solved with the embodiments disclosed herein.

Figure 6:
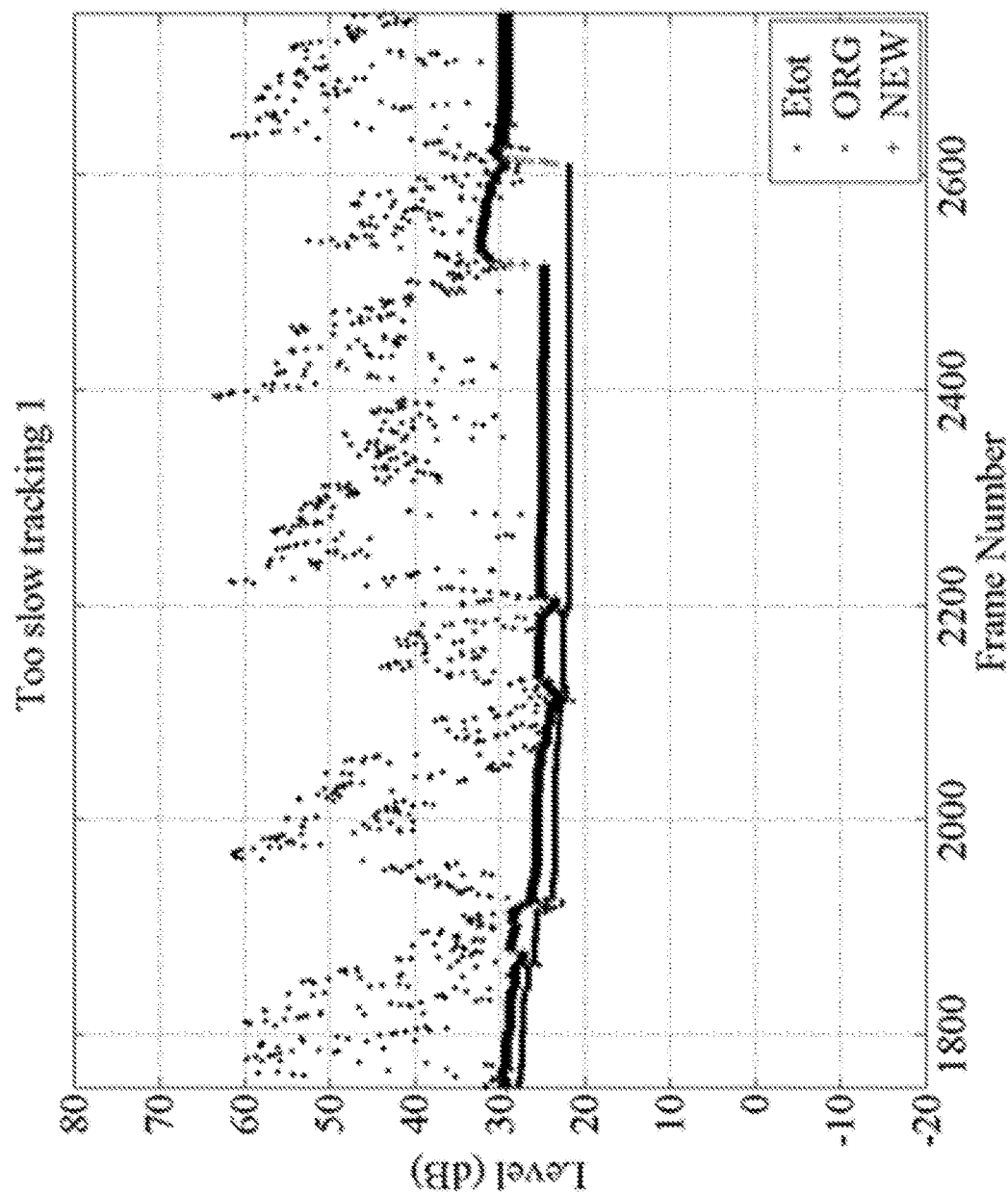
FIGS. 6-9 are diagrams showing how the embodiments allow for better tracking of background noise in audio signals.

FIG. 6 is a diagram showing the energy, Etot (dots) of a number of frames of an audio signal. The diagram shows the background estimated with prior art solution (lower, thinner curve, "x"), and estimated according to an embodiment of the suggested solution (upper, thicker curve, "+"). This diagram shows how the embodiments allow for better tracking of the background noise by keeping the total energy estimate at a higher level and by reacting quicker e.g. around frame 2510 compared to 2610 for the original solution.

Figure 7:
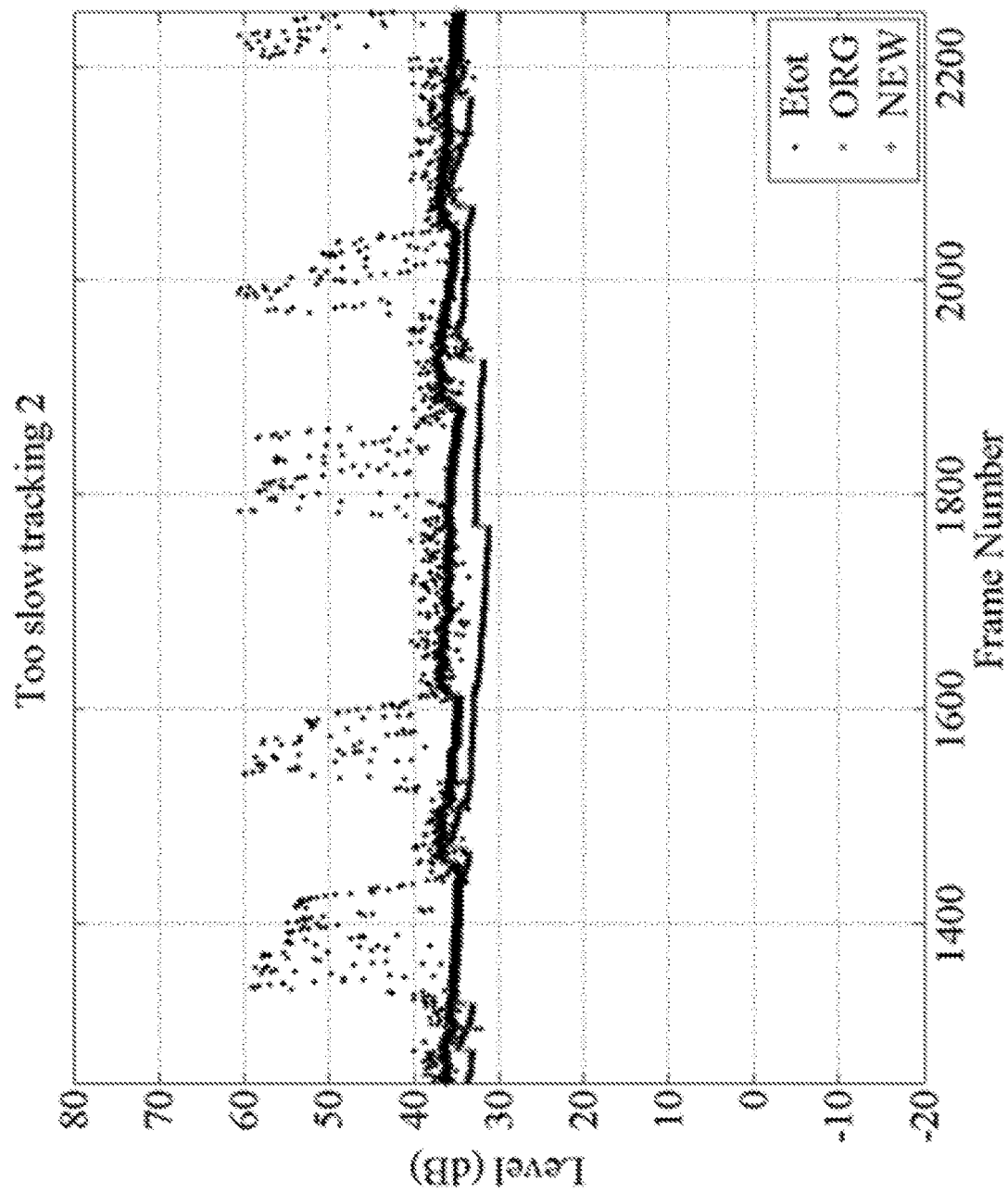

FIG. 7 is also a diagram showing the energy, Etot (dots) of a number of frames of an audio signal. The diagram shows the background estimated with prior art solution (lower, thinner curve, "x"), and estimated according to an embodiment of the suggested solution (upper, thicker curve, "+"). It can be seen that the estimation according to the herein suggested solution tracks the background noise more efficiently, e.g. the background noise between the utterances, in particular in the frame number range 1600-1700.

Figure 8:
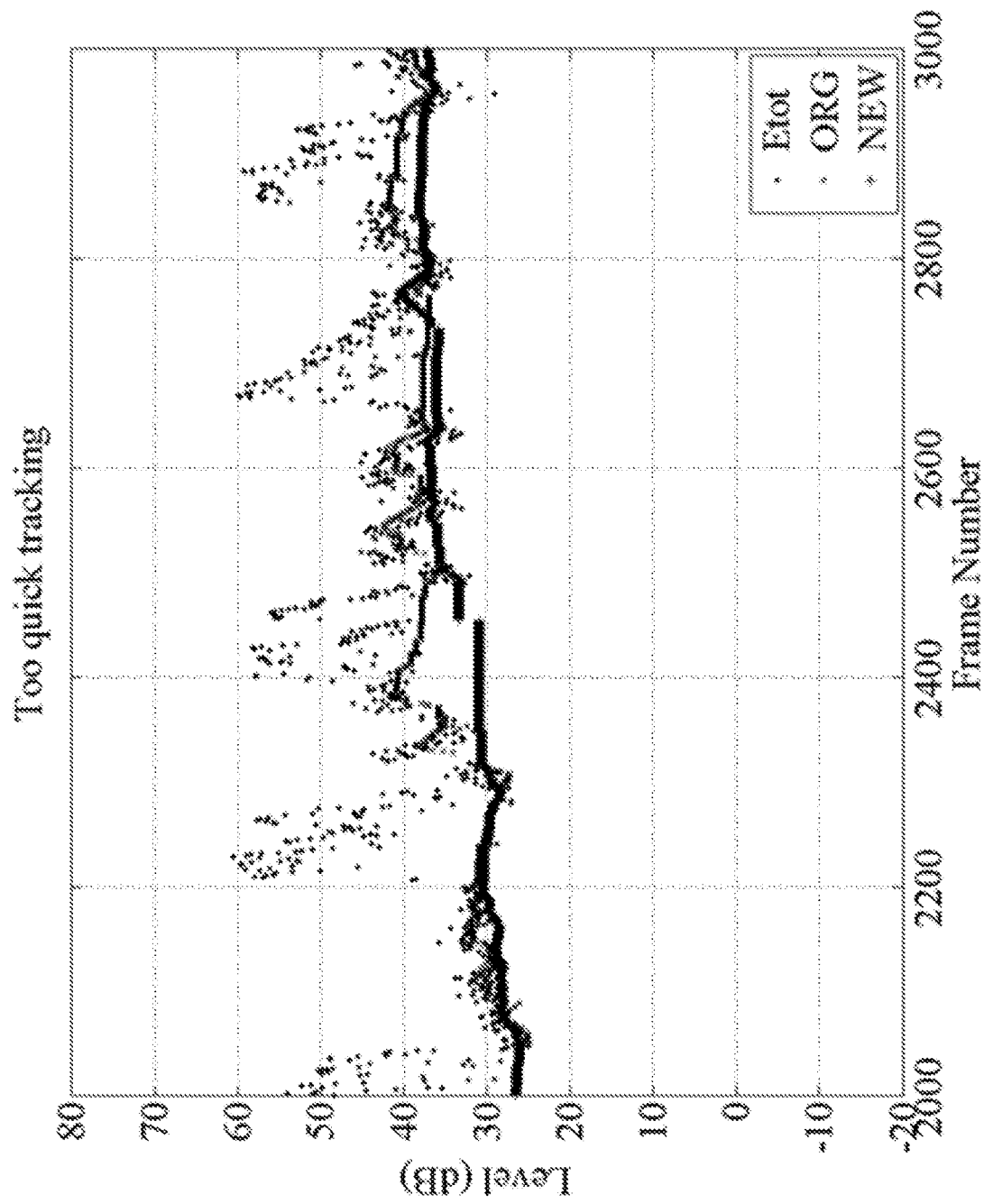

FIG. 8 is also a diagram showing the energy, Etot (dots) of a number of frames of an audio signal. The diagram shows the background estimated with prior art solution (more upper, thinner curve, "x"), and estimated according to an embodiment of the suggested solution (more lower, thicker curve, "+"). The diagram shows the benefit of the suggested solution as compared to when the (prior art) tracking of background is too efficient. While there is burst of energy in the background between frames 2300 and 2400, there is an increased risk of front end clipping of the utterance starting at frame 2400.

Figure 9:
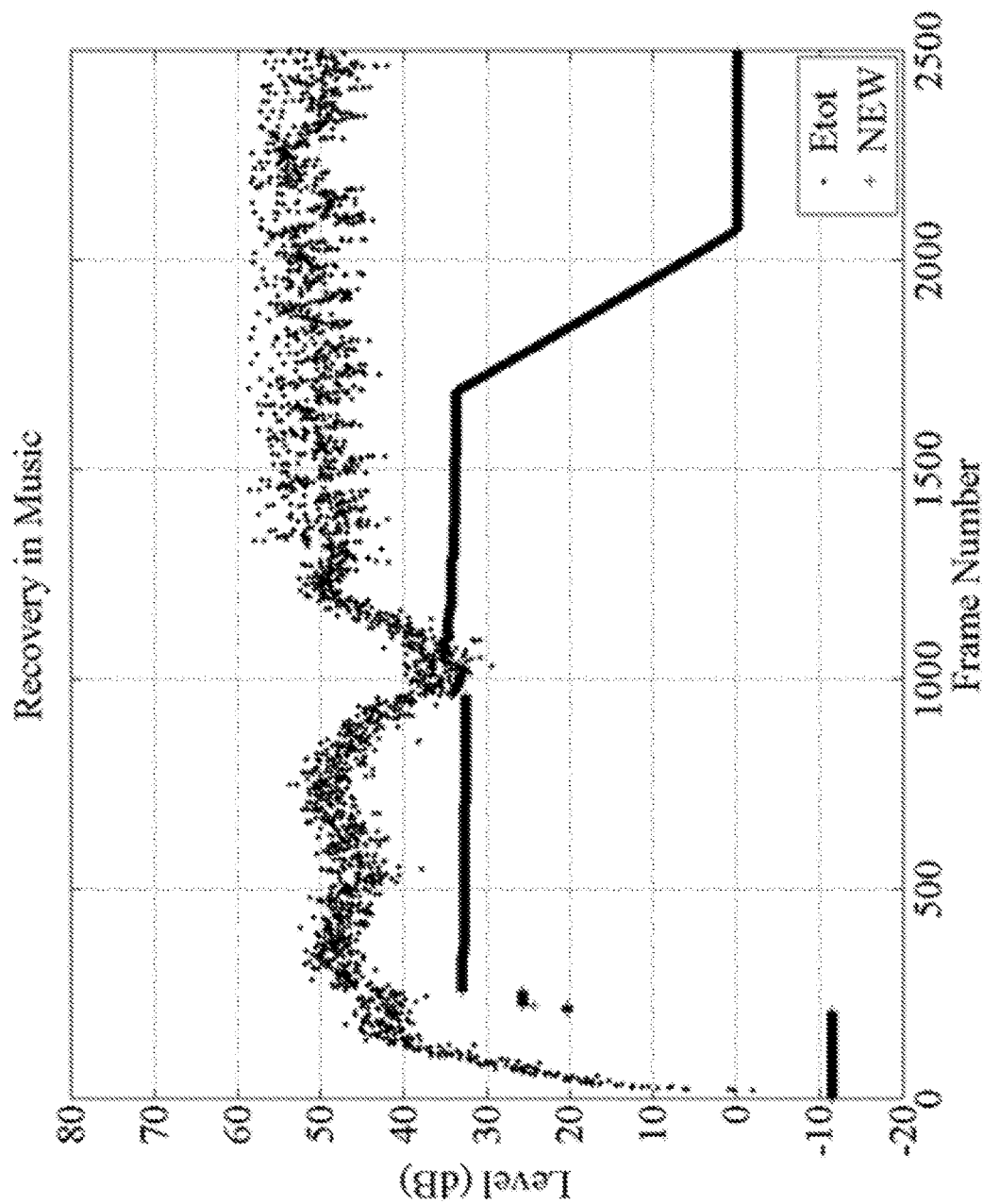

FIG. 9 is also a diagram showing the energy, Etot (dots) of a number of frames of an audio signal, in this case a music signal. The music file for this illustration has a very noise like start and this causes the noise estimation to make a wrong decision and allow for an update a bit into the file (around frame 200). However, with the forced background reduction, it starts to recover at frame 1700 and by frame 2100 the noise estimate is down to the lowest level for the forced reduction. As seen from the figure it would not be possible to have the same background level reduction with the normal update logic as the input is higher than the background estimate for most of the frames.

Concluding Remarks

The background estimator described above may be comprised in a SAD, a codec and/or in a device, such as a communication device. The communication device may be a user equipment (UE) in the form of a mobile phone, video camera, sound recorder, tablet, desktop, laptop, TV set-top box or home server/home gateway/home access point/home router. The communication device may in some embodiments be a communications network device adapted for coding and/or transcoding. Examples of such communications network devices are servers, such as media servers, application servers, routers, gateways and radio base stations. The communication device may also be adapted to be positioned in, i.e. being embedded in, a vessel, such as a ship, flying drone, airplane and a road vehicle, such as a car, bus or lorry. Such an embedded device would typically belong to a vehicle telematics unit or vehicle infotainment system.

The steps, functions, procedures, modules, units and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules, units and/or blocks described above may be implemented in software such as a computer program for execution by suitable processing circuitry including one or more processing units. The software could be carried by a carrier, such as an electronic signal, an optical signal, a radio signal, or a computer readable storage medium before and/or during the use of the computer program in the network nodes.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors, DSPs, one or more Central Processing Units, CPUs, and/or any suitable programmable logic circuitry such as one or more Field Programmable Gate Arrays, FPGAs, or one or more Programmable Logic Controllers, PLCs. That is, the units or modules in the arrangements in the different nodes described above could be implemented by a combination of analog and digital circuits, and/or one or more processors configured with software and/or firmware, e.g. stored in a memory. One or more of these processors, as well as the other digital hardware, may be included in a single application-specific integrated circuitry, ASIC, or several processors and various digital hardware may be distributed among several separate components, whether individually packaged or assembled into a system-on-a-chip, SoC.

It should also be understood that it may be possible to re-use the general processing capabilities of any conventional device or unit in which the proposed technology is implemented. It may also be possible to re-use existing software, e.g. by reprogramming of the existing software or by adding new software components.

The embodiments described above are merely given as examples, and it should be understood that the proposed technology is not limited thereto. It will be understood by those skilled in the art that various modifications, combinations and changes may be made to the embodiments without departing from the present scope. In particular, different part solutions in the different embodiments can be combined in other configurations, where technically possible.

When using the word "comprise" or "comprising" it shall be interpreted as non-limiting, i.e. meaning "consist at least of".

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the technology disclosed herein, for it to be encompassed hereby.

In some instances herein, detailed descriptions of well-known devices, circuits, and methods are omitted so as not to obscure the description of the disclosed technology with unnecessary detail. All statements herein reciting principles, aspects, and embodiments of the disclosed technology, as well as specific examples thereof, are intended to encompass both structural and functional equivalents thereof. Additionally, it is intended that such equivalents include both currently known equivalents as well as equivalents developed in the future, e.g. any elements developed that perform the same function, regardless of structure.

ABBREVIATIONS

AMR Adaptive Multi-Rate
DTX Discontinuous Transmission

VAD Voice Activity Detector
3GPP Third Generation Partnership Project
SID Silence Insertion Descriptor
SAD Voice Activity Detector
SNR Signal-to-Noise Ratio
WB Wide-Band

The invention claimed is:

1. A method by an apparatus, the method comprising:
performing by at least one processor of the apparatus:
when a current energy level of an audio signal segment is higher than a current sub-band noise estimate and no pause is in the audio signal segment, reducing the current sub-band noise estimate by reducing the current sub-band noise estimate by a defined amount for at least one sub-band of the audio signal segment.

2. The method according to claim 1, wherein reducing the current sub-band noise estimate when the current energy level of the audio signal segment is higher than the current sub-band noise estimate and no pause is in the audio signal segment comprises reducing the current sub-band noise estimate by the defined amount for the at least one sub-band of the audio signal segment responsive to the audio signal segment comprising music when the current energy level of the audio signal segment is higher than the current sub-band noise estimate, and no pause is in the audio signal segment.

3. The method according to claim 1, wherein no pause is in the audio signal segment when one or both of the following is fulfilled:
a predefined number of consecutive preceding audio signal segments have been determined to comprise an active signal;
a dynamic of an audio signal comprising an audio signal segment does not exceed a signal dynamics threshold.

4. The method according to claim 1, further comprising responsive to the current sub-band noise estimate satisfying a defined rule, reducing the current sub-band noise estimate by the defined amount for the at least one sub-band of the audio signal segment.

5. The method according to claim 4, wherein the current sub-band noise estimate satisfies the defined rule when the current sub-band noise estimate exceeds a predefined value.

6. The method according to claim 4, wherein the current sub-band noise estimate satisfies the defined rule when an energy level of an audio signal segment is less than a threshold level higher than a long term minimum energy level (lt_min) determined over a plurality of preceding audio signal segments.

7. The method according to claim 6, wherein an energy level of an audio signal segment is determined to be less than the threshold level higher than lt_min based on information derived from an input audio signal and not based on use of information from a sound activity detector.

8. The method according to claim 1, wherein reducing the current sub-band noise estimate by the defined amount comprises:
determining a step size to reduce the current sub-band noise estimate; and
reducing the current sub-band noise estimate by the step size.

9. An apparatus comprising:
at least one processor configured to perform operations comprising:
when a current energy level of an audio signal segment is higher than a current sub-band noise estimate and no pause is in the audio signal segment, reducing the current sub-band noise estimate by reducing the current sub-band noise estimate by a defined amount for at least one sub-band of the audio signal segment.

10. The apparatus according to claim 9, wherein reducing the current sub-band noise estimate when the current energy level of the audio signal segment is higher than the current sub-band noise estimate and no pause is in the audio signal segment comprises reducing the current sub-band noise estimate by the defined amount for the at least one sub-band of the audio signal segment responsive to the audio signal segment comprising music when the current energy level of the audio signal segment is higher than the current sub-band noise estimate, and no pause is in the audio signal segment.

11. The apparatus according to claim 9, wherein no pause is considered to in the audio signal segment when one or both of the following is fulfilled:
a predefined number of consecutive preceding audio signal segments have been determined to comprise an active signal;
a dynamic of an audio signal comprising an audio signal segment does not exceed a signal dynamics threshold.

12. The apparatus according to claim 9, wherein the at least one processor configured to perform further operations comprising:
responsive to the current sub-band noise estimate satisfying a defined rule, reducing the current sub-band noise estimate by the defined amount for the at least one sub-band of the audio signal segment.

13. The apparatus according to claim 12, wherein the current sub-band noise estimate satisfies the defined rule when the current sub-band noise estimate exceeds a predefined value.

14. The apparatus according to claim 12, wherein the at least one processor performs further operations comprising setting a flag to indicate that the energy level of the audio signal segment is close to a long term minimum energy level (lt_min).

15. The apparatus according to claim 12, wherein the current sub-band noise estimate satisfies the defined rule when an energy level of an audio signal segment is less than a threshold level higher than a long term minimum energy level (lt_min) determined over a plurality of preceding audio signal segments, wherein an energy level of an audio signal segment is determined to be less than the threshold level higher than lt_min based on information derived from an input audio signal, and not based on use of information from a sound activity detector.

16. The apparatus according to claim 12, wherein in reducing the current sub-band noise estimate responsive to the current sub-band noise estimate satisfying the defined rule, the at least one processor performs operations comprising:
determining a step size to reduce the current sub-band noise estimate; and
reducing the current sub-band noise estimate by the step size.

17. A computer program product comprising a non-transitory computer readable storage medium storing instructions which, when executed on at least one processor, cause the at least one processor to perform operations comprising:
when a current energy level of an audio signal segment is higher than a current sub-band noise estimate and no pause is detected in the audio signal segment, reducing the current sub-band noise estimate by reducing the current sub-band noise estimate by a defined amount for at least one sub-band of the audio signal segment.

18. The computer program product of claim 17, wherein reducing the current sub-band noise estimate when the current energy level of the audio signal segment is higher than the current sub-band noise estimate and no pause is detected in the audio signal segment comprises reducing the current sub-band noise estimate by the defined amount for the at least one sub-band of the audio signal segment responsive to the audio signal segment comprising music when the current energy level of the audio signal segment is higher than the current sub-band noise estimate, and no pause is detected in the audio signal segment.

19. The computer program product of claim 17, wherein no pause is considered to in the audio signal segment when one or both of the following is fulfilled:
   a predefined number of consecutive preceding audio signal segments have been determined to comprise an active signal;
   a dynamic of an audio signal comprising an audio signal segment does not exceed a signal dynamics threshold.

20. The computer program product of claim 17, wherein the non-transitory computer readable storage medium stores further instructions which, when executed on the at least one processor, cause the at least one processor to perform further operations comprising:
   responsive to the current sub-band noise estimate satisfying a defined rule, reducing the current sub-band noise estimate by the defined amount for the at least one sub-band of the audio signal segment.

* * * * *

UNITED STATES PATENT AND TRADEMARK OFFICE
CERTIFICATE OF CORRECTION

PATENT NO. : 11,164,590 B2
APPLICATION NO. : 16/738504
DATED : November 2, 2021
INVENTOR(S) : Martin Sehlstedt It is certified that error appears in the above-identified patent and that said Letters Patent is hereby corrected as shown below:

In the Specification

In Column 6, Line 32, delete "10*log 10 ΣZbackr[i]," and insert -- 10*log 10 Σbackr[i], --, therefor.

In Column 9, Line 22, delete "Etot_I" and insert -- Etot_l; --, therefor.

In Column 9, Line 23, delete "Etot_I_Ip;" and insert -- Etot_l_lp; --, therefor.

In Column 9, Line 24, delete "Etot_I" and insert -- Etot_l --, therefor.

In Column 9, Line 41, delete "sign_dyn_Ip;" and insert -- sign_dyn_lp; --, therefor.

In Column 11, Line 22, delete "lt_to_track" and insert -- lt_tn_track --, therefor.

In Column 12, Line 11, delete "Etot_I." and insert -- Etot_l. --, therefor.

Signed and Sealed this
Fifth Day of July, 2022

Katherine Kelly Vidal
*Director of the United States Patent and Trademark Office*